United States Patent Office 2,791,596
Patented May 7, 1957

2,791,596

OBTAINING PURE PALMITIC ACID FROM VEGETABLE OIL ACIDS

Frank C. Magne, Evald L. Skau, and Robert R. Mod, New Orleans, La., assignors to the United States of America as represented by the Secretary of Agriculture No Drawing. Application August 19, 1955,
Serial No. 529,600

7 Claims. (Cl. 260—419)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a process of obtaining a substantially pure saturated higher fatty acid, particularly palmitic acid, from the mixture of acids obtained from the naturally occurring glyceride oils or fats, and relates further to the concurrent production of a mixture of morpholine salts of the predominantly unsaturated fatty acids also contained in the said mixture of acids. As used herein the term "saturated higher fatty acid" relates to the saturated fatty acids of at least 12 carbon atoms found in naturally occurring glycerides.

In general, the separation procedures which are adapted for large scale production do not produce substantially pure saturated acids of this type. The saponification of the naturally occurring glycerides produces a mixture of homologous saturated higher fatty acids and their unsaturated analogs. The mixed acids have boiling points which are so high and so nearly equal that they cannot feasibly be separated in substantially pure form by fractional distillation. While the melting points of the acids vary considerably, the acids cannot feasibly be separated by fractional crystallization from a molten mass of the acids or from a hydrocarbon solution of the acids. In such crystallization procedures, the acids tend to solidify in the form of crystals containing molecules of different acids. Where a substantially pure saturated higher fatty acid is desired, it is usually obtained by repeated fractional crystallizations from rather large amounts of an oxygen containing organic solvent such as acetone. However, such procedures require many recrystallization steps, the yields of substantially pure acid are relatively low and the purified acid produced still contains appreciable amounts of closely related homologs and unsaturated analogs.

In general, this invention provides a process of recovering substantially pure palmitic acid from a mixture of naturally occurring glyceride acids in which palmitic acid (P), other saturated fatty acids (S) and unsaturated fatty acids (U) are present in weight proportions in which $$\frac{P}{P+S}$$

is greater than about 7/10 and $$\frac{P}{P+S+U}$$

is less than about 1/2. In this process all of the acids are converted to their amine salts by mixing the mixed acids with cyclohexylamine, benzylamine, or a solution of cyclohexylamine or benzylamine in a liquid amine which forms a palmitic acid salt having a melting point less than about 65° C., the cyclohexylamine or benzylamine being used in sufficient quantity to neutralize the palmitic acid present in the mixed acids while the liquid amine, when utilized, being used in sufficient quantity to neutralize the predominately unsaturated acids present. The amine salts are converted to a homogeneous liquid solution, preferably by dissolving them in a relatively small amount of a volatile organic solvent. The palmitic acid amine salts are fractionally crystallized by cooling the solution to a temperature at which the least soluble component crystallizes and maintaining the crystallizing solution at a temperature at which the crystallization continues until the desired proportion of the palmitic acid amine salts have crystallized. The palmitic acid amine salts are mechanically isolated, recrystallized if desired, decomposed by the action of a strong acid, and the palmitic acid is recovered from the amine salt decomposition products. The cyclohexylamine or benzylamine salts of palmitic acid are the least soluble components of the mixed amine salts, and the crystals which form at about the temperature at which crystals first appear in a homogeneous solution of the amine salts, whether the solution consists of the molten salts or a solution of them in an inert solvent, consist essentially of substantially pure palmitic acid salts of cyclohexylamine or benzylamine.

In one preferred embodiment, this invention provides a process of concurrently producing, from a mixture of naturally occurring glyceride acids of the type described above, both a substantially pure palmitic acid and a valuable mixture of morpholine salts of predominantly unsaturated fatty acids. This process involves: mixing the mixed acids with a mixture of amines consisting of enough cyclohexylamine or benzylamine to neutralize the saturated acids present in the mixed acids and an amount of morpholine sufficient to neutralize the unsaturated acids, isolating palmitic acid salts of cyclohexylamine or benzylamine in the manner described above, and recovering from solution in the mother liquor from which the palmitic acid salts were crystallized, the morpholine salts of a predominantly unsaturated fraction of the acids. These morpholine salts can readily be converted to mixed morpholides which are uniquely valuable, as plasticizers and the like. Such mixed morpholides and their production are described in greater detail in our copending patent application Serial No. 529,599, filed of even date.

The process of this invention can advantageously be applied to substantially any of the mixtures of naturally occurring glyceride acids produced by saponifying a vegetable or animal fat or oil in which $$\frac{P}{P+S}$$

is greater than about 7/10 and acidifying the salts produced. Illustrative examples of naturally occurring glycerides that yield suitable mixtures of acids include: vegetable oils such as cottonseed oil, olive oil, palm oil, corn oil, teaseed oil, soybean oil, and the like; animal fats such as lard, neat's-foot oil, marine oils and the like.

In the fractional crystallization of the mixture of amine salts, it is generally preferable to dissolve the amine salts in enough of a volatile liquid, inert organic solvent to form a substantially saturated solution at a temperature between about normal room temperature (20 to 30° C.) and the boiling point of the solvent. Illustrative examples of suitable solvents include: ketones, such as acetone and methyl ethyl ketone; alcohols, such as methyl, ethyl, isopropyl and tert-butyl alcohol; esters, such as methyl acetate, ethyl propionate, and amyl acetate; ethers, such as diethyl ether, dioxane and anisole; and hydrocarbons such as pentane, cyclohexane and benzene. Benzene and acetone and mixtures thereof have been found to be particularly suitable.

In general, the least soluble component of such a solution of the amine salts, the cyclohexylamine or benzylamine salts of palmitic acid, crystallize at about room temperature. And usually, when a crystallizing solution of the amine in such a solid is allowed to stand at a temperature below about room temperature for from about 1 to 12 hours, substantially all of the palmitic acid amine salts crystallize, while substantially all of the salts of the unsaturated fatty acids and saturated fatty acids other than palmitic acid remain dissolved in the mother liquor. The rate at which palmitic acid salts are being removed from solution in the mother liquor while crystallization is occurring, and the proportion of the amount of the palmitic acid originally present in the mixed acids which has been so removed at a given time can readily be determined by the amount of change in the iodine and thiocyanogen values of the mother liquor.

The following examples are illustrative of the details of at least one method of practicing this invention.

*Example 1*

A 100 gram sample of cottonseed fatty acids (M. P. 39.8° C., iodine value 113.7; obtained by saponifying a refined cottonseed oil and acidulating the resulting soaps) and 35.8 grams of cyclohexylamine were dissolved in 500 ml. of warm acetone. The resulting solution was allowed to stand 24 hrs. at room temperature to permit the crystallization of the more insoluble amine salts of the fatty acids present. The crystalline solid was filtered off on a Buchner funnel under light suction. The wet solid was removed and amount to 123 grams on a wet basis. This is referred to as sample A.

A 10 gram portion of sample A was slurried with an excess of hot (70–80° C.) dilute HCl, to decompose the fatty acid amine salt. After cooling, the solidified acid was removed and extracted in a liquid-liquid extractor (modified Soxhlet) with hot dilute HCl followed by hot water. The amount of palmitic acid recovered weighed 3 grams, when vacuum dried, and had a M. P. of 51.7° C., and an iodine value of 42.0. The bulk of sample A (113 grams wet) was dissolved in 34 grams warm acetone and allowed to recrystallize at room temperature for a period of several hours. The mother liquor was centrifugally isolated; leaving 33.8 grams of a white salt. This white salt is referred to as sample B.

A 7 gram portion of sample B (6.7 gm. dry) was converted to the acid by the procedure used for sample A. After drying, the palmitic acid recovered weighed 3.5 grams and had a M. P. of 59.6° C., and an iodine value of 10.1.

The remainder of sample B, 26.8 grams, was recrystallized from 95 grams of acetone, centrifugation being employed to remove the mother liquor, and 14.7 grams of solid material was obtained. Treatment of the 14.7 grams with mineral acid followed by extraction as previously described gave 9.5 grams of dry palmitic acid having a melting point of 62.3° C. and an iodine value of 1.3. The M. P. of pure palmitic acid is 62.5° C.

*Example 2*

A 25 gram sample of the cottonseed acids used in the previous example, 2.3 grams of cyclohexylamine and 6.0 grams of morpholine were dissolved in 100 ml. of warm acetone. The solution was allowed to stand 48 hours at 3° C. and the crystals that formed were filtered off on a pre-cooled Buchner funnel at 3° C. These crystalline solids were given three recrystallizations from 25 ml. portions of acetone using centrifugation to remove the mother liquor.

The white crystalline salt was then treated with mineral acid and extracted as described in Example 1, in order to recover palmitic acid. After vacuum drying the recovered acid weighed 2.0 grams and had a M. P. of 62.2° C. Pure palmitic acid has a M. P. of 62.5° C.

We claim:

1. A process of recovering substantially pure palmitic acid from a mixture of naturally occurring glyceride acids in which palmitic acid (P), other saturated fatty acids (S), and unsaturated fatty acids (U) are present in weight proportions in which $$\frac{P}{P+S}$$

is greater than about 7/10 and $$\frac{P}{P+S+U}$$

is less than about ½, comprising converting the mixed acids to amine salts by mixing them with a member selected from the group consisting of cyclohexylamine, benzylamine, a solution of cyclohexylamine in a liquid amine that forms a palmitic acid salt having a melting point of less than about 65° C., and a solution of benzylamine in a liquid amine that forms a palmitic acid salt having a melting point of less than about 65° C., said cyclohexylamine and benzylamine being used in sufficient amount to neutralize the palmitic acid present in the mixed acids, forming a homogeneous liquid solution of the resulting amine salts in a volatile, inert organic solvent, fractionally crystallizing palmitic acid amine salt from the resulting solution at a temperature up to about room temperature, isolating the formed crystals of the palmitic acid amine salt from the mother liquor, decomposing the crystals by the action of a strong acid, and recovering substantially pure palmitic acid from the amine salt decomposition product.

2. The process of claim 1 wherein the naturally occurring glyceride acids are the cottonseed acids.

3. The process of claim 1 wherein the member is cyclohexylamine.

4. The process of claim 1 wherein the naturally occurring glyceride acids are the cottonseed acids and the member is cyclohexylamine.

5. The process of claim 1 wherein the liquid amine that forms a palmitic acid salt having a melting point of less than about 65° C. is morpholine.

6. A process of concurrently recovering substantially pure palmitic acid and a mixture of the salts of a liquid amine that forms a palmitic acid salt having a melting point of less than about 65° C. and predominantly unsaturated fatty acids from a mixture of naturally occurring glyceride acids in which palmitic acid (P), other saturated fatty acids (S), and unsaturated fatty acids (U) are present in weight proportions in which $$\frac{P}{P+S}$$

is greater than about 7/10 and $$\frac{P}{P+S+U}$$

is less than about ½ comprising mixing the mixed acids with a member selected from the group consisting of a solution of cyclohexylamine in a liquid amine that forms a palmitic acid salt having a melting point of less than about 65° C. and a solution of benzylamine in a liquid amine that forms a palmitic acid salt having a melting point of less than about 65° C., said cyclohexylamine and benzylamine being used in sufficient amount to neutralize the palmitic acid present in the mixed acids, thereby converting the palmitic acid and other saturated acids to the amine salts thereof while simultaneously converting the predominantly unsaturated acids to the salts of the liquid amine that forms a palmitic acid salt having a melting point of less than about 65° C., forming a homogeneous liquid solution of the resulting salts in a volatile, inert organic solvent, fractionally crystallizing palmitic acid amine salt from the resulting solution at a temperature up to about room temperature to form crystals of the palmitic acid amine salt, isolating the crystals of the palmitic acid amine salt from the mother liquor which contains the salts of the predominantly unsaturated acids with the liquid amine that forms a palmitic acid salt having a melting point of less than about 65° C. dissolved therein and recoverable therefrom, decomposing the crystals by the action of a strong acid, and recovering substantially pure palmitic acid from the amine salt decomposition product.

7. The process of claim 6 wherein the liquid amine that forms a palmitic acid salt having a melting point of less than about 65° C. is morpholine.

References Cited in the file of this patent

UNITED STATES PATENTS 2,575,526    Meyers _____ Nov. 20, 1951

OTHER REFERENCES

Ralston: "Fatty Acids and their Derivatives," copyright 1948, pages 284–285.